(12) United States Patent
Ashwood et al.

(10) Patent No.: US 7,497,888 B2
(45) Date of Patent: Mar. 3, 2009

(54) FLEXIBLE SIZE ADJUSTABLE FILTER ELEMENT

(76) Inventors: Matthew P. Ashwood, 774 Perimeter Hills, Brentwood, TN (US) 37027; David M. Kent, 126 Parkers Chapel Rd., Portland, TN (US) 37148

(*) Notice: Subject to any disclaimer, the term of this patent is extended or adjusted under 35 U.S.C. 154(b) by 278 days.

(21) Appl. No.: 11/469,650

(22) Filed: Sep. 1, 2006

(65) Prior Publication Data

US 2007/0084168 A1    Apr. 19, 2007

Related U.S. Application Data

(60) Provisional application No. 60/713,673, filed on Sep. 2, 2005.

(51) Int. Cl.
*B01D 46/00* (2006.01)
*B01D 46/52* (2006.01)

(52) U.S. Cl. .............. 55/499; 55/481; 55/483; 55/491; 55/496; 55/497; 55/DIG. 31

(58) Field of Classification Search ........... 55/481, 55/491, 496, 497, 499, 500, 501, 506, 511, 55/DIG. 31, 483

See application file for complete search history.

(56) References Cited

U.S. PATENT DOCUMENTS

| | | | | |
|---|---|---|---|---|
| 5,364,458 A | * | 11/1994 | Burnett et al. | 96/55 |
| 5,476,526 A | * | 12/1995 | Attermeyer | 55/496 |
| 5,797,975 A | * | 8/1998 | Davis | 55/493 |
| 6,007,596 A | * | 12/1999 | Rosen | 55/491 |
| 6,152,980 A | | 11/2000 | Culwell | |
| 7,037,354 B1 | * | 5/2006 | Dimicelli | 55/497 |
| 7,077,921 B1 | * | 7/2006 | Dimicelli | 156/60 |

* cited by examiner

*Primary Examiner*—Duane S Smith
*Assistant Examiner*—Robert A Clemente
(74) *Attorney, Agent, or Firm*—Wayne Edward Ramage; Baker Donelson

(57) ABSTRACT

An air filter element partially-fabricated on site wherein one or more wire frames are fastened to one another to form a structure substantially conforming to the dimensions of the original equipment manufacturer's filter housing. One or more of the wire frames are flexibly attached to each other end-to-end by flexible attachment means, allowing the assembled filter unit to be inserted into the filter housing one frame at a time, with the frame sections yet to be inserted folded or directed off to one side, thus bypassing space restrictions. Flexible attachment means may comprise spring connectors. Also disclosed is an end-cap affixed to or formed at one or both ends of the filter element. The end-caps may also contain printed material, such as text or pictures, which may include instructions for use, identifying labels or symbols, or the like.

15 Claims, 13 Drawing Sheets

FLEXIBLE SIZE ADJUSTABLE FILTER ELEMENT

This application claims priority to Provisional Patent Application No. 60/713,673, filed Sep. 2, 2005, by Matt Ashwood, and is entitled in whole or in part to that filing dates for priority. The specification, drawings, and attachments of Provisional Patent Application No. 60/713,673 are incorporated herein in their entirety by reference.

FIELD OF INVENTION

The present invention relates to heating, ventilating and air conditioning systems. More particularly, the present invention relates to a flexible or folding size adjustable filter element being partially fabricated on site wherein one or more wire frames are flexibly fastened to one another to form a structure substantially conforming to the unit's original equipment manufacturer's filter housing.

BACKGROUND OF INVENTION

There are numerous means for removing particle matter from atmospheric air before introducing said air into a heating, venting, and/or air conditioning system. Typically, these systems have one or more removable and replaceable rigid filter elements which are manufactured to a specific length and height and inserted into a channeled filter housing to effectively seal the unit from the introduction of dust, dirt, and pollen.

Over time, contaminants build up on the filter media, thus necessitating replacement of the filter element. This typically requires the field technician to purchase a filter element from the original equipment manufacturer or a third party supplier. This system often leaves the technician with little choice but to stock every or most conceivable filter elements and to carry them from job site to job site. The alternative is to order the replacement filter element and schedule a second on-site maintenance call to install the element when it arrives.

In addition, replacement filter elements frequently allows significant contaminated airflow to circulate around the replaceable filter elements due to variations in tolerances between the replaceable filter elements and the original equipment manufacturers' channeled filter housing. As a result, the field technician usually is forced to clean the air conditioning system and the attached ductwork and air distribution registers much more frequently than necessary if a proper air seal integrity were achievable. This condition also decreases the mechanical and thermodynamic efficiency of the original equipment manufacturer's air conditioning system.

Further, the standard cardboard superstructure employed to give rigidity to replacement filter elements may result in the rigidity deteriorating during high humidity conditions or rainstorms. The replacement filter element may then be drawn out of the air conditioning system's channeled filter housing and into the air-moving fan, thus destroying the replaceable filter element's ability to filter. Use of the cardboard superstructure also blinds a portion of the replaceable filter element and reduces the capacity of the filter element to capture and retain particulate matter. And finally, use of cardboard superstructure requires the use of wood fiber and is not environmentally conservative.

A solution to several of these problems was presented in Culwell, U.S. Pat. No. 6,152,980, the specification of which is incorporated herein by reference. Culwell describes an air filter element that is partially fabricated on site. Instead of a cardboard superstructure, one or more wire frames are overlapped and rigidly fastened together using a high tensile strength adhesive tape to form a structure substantially conforming to the dimensions of the original equipment manufacturer's filter housing. The filter media is attached to the rigid wire frame by selective drawing pleated filter material around a portion of a wire member and securing the pleats to each other by means of epoxy coated staples.

Nevertheless, several problems still remain. Some equipment, such as supermarket refrigeration units, require long air filter elements. However, such equipment often is installed in such a manner where access to the filter housing is limited in space, so that a replacement air filter of the proper length cannot be inserted into the filter housing without moving the unit or neighboring equipment. Furthermore, problems have been found with the ends of the filter element being exposed during shipping, assembly and insertion, resulting in damage to the filter element and injury to the individual doing the installation.

Thus, what is needed is an improved means to fabricate a foldable or flexible filter element on-site with limited access space, on an as-needed basis and in a custom size providing a positive seal, with greater ease of assembly in the field and protection for the ends of the filter element.

SUMMARY OF THE INVENTION

The present invention overcomes the shortcomings of the prior art by providing a filter element that is partially fabricated on site wherein one or more wire frames are flexibly attached to each other end-to-end using flexible attachment means to form a structure substantially conforming to the dimensions of the original equipment manufacturer's filter housing. The flexible attachment means hold the wire frame members together without overlap. The wire frames when inserted into the filter housing provides the necessary structural support for a filter element and wire mesh. Because the wire frame members are flexibly attached, the assembled filter unit of the present invention can be inserted into the filter housing one frame at a time, with the frame sections yet to be inserted folded or directed off to one side, thus bypassing space restrictions that would prevent a full-sized filter unit with rigidly attached frame members, constructed in accordance with the prior art, from being removed or inserted.

In one exemplary embodiment, the flexible attachment means comprises one or more spring connectors. The spring connectors are sufficiently flexible to allow the spring connector to be turned and threaded over the wire frame members. The spring connectors also may be sized so as to fit within a segment of the wire fame members bounded by a cross piece or top or bottom of the wire frame, so as to prevent adjacent frames from moving vertically with respect to each other.

In another exemplary embodiment, a precise length can be achieved by causing the last wire frame member to overlap with the adjacent wire frame member. One or more spring connectors may then be threaded horizontally along one or more cross pieces of the two wire frame members.

In another exemplary embodiment, one or more end-caps are affixed to one or both ends of the filter element to protect the filter element from abrasion and wear during shipping, handling, and installation of the filter, and to protect the installer from injury. The end-cap may be made of any appropriate protective material, including, but not limited to, adhesive tape, cardboard, heavy paper, or plastic material. In yet another exemplary embodiment, the end-cap may contain printed material, such as text or pictures, which may include instructions for use, identifying labels or symbols, or the like.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DETAILED DESCRIPTION OF THE INVENTION

Figure 8:
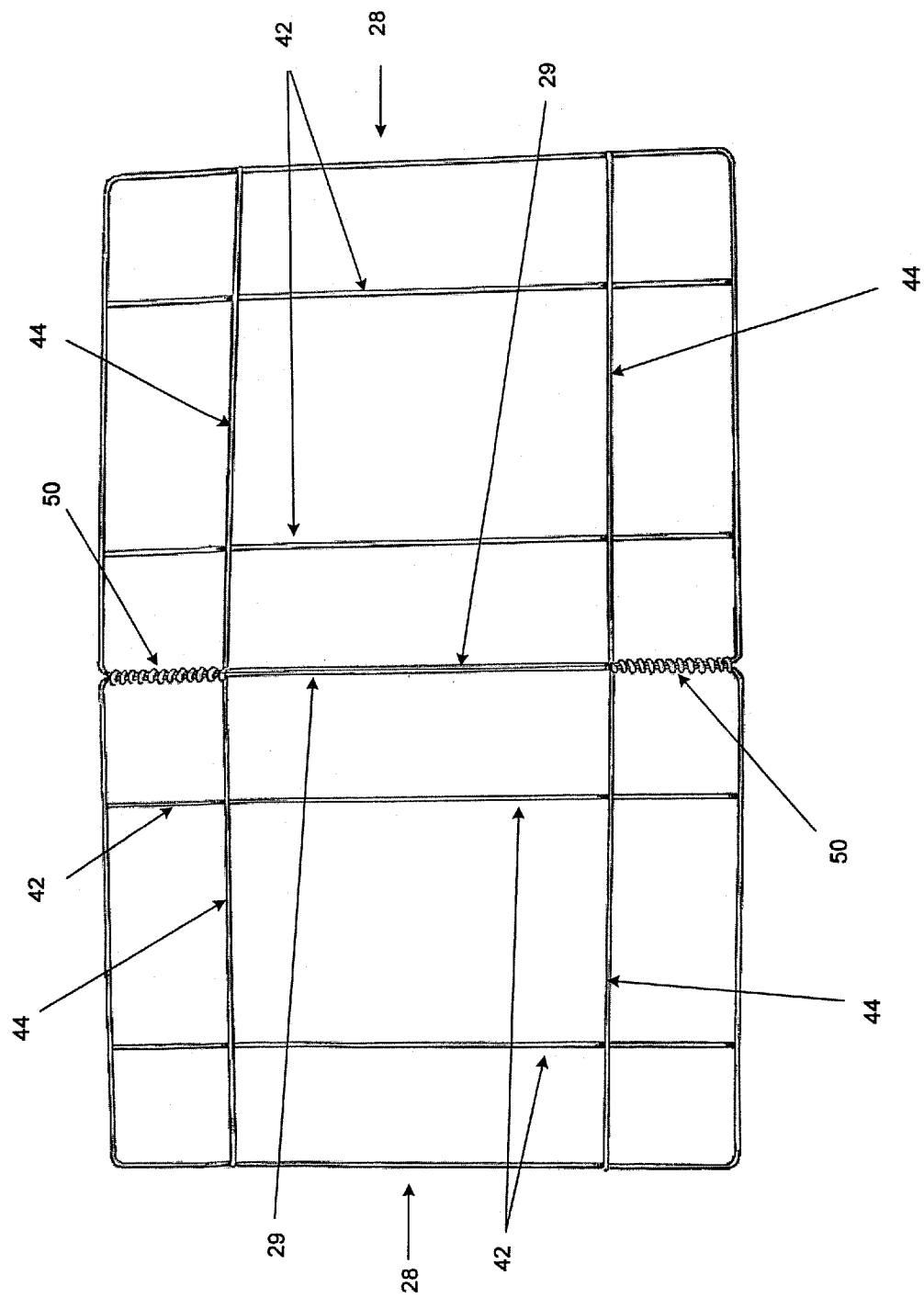
FIG. 8 is a diagrammatic illustration of how two frame members are flexibly connected in accordance with one embodiment of the present invention.
Figure 9:
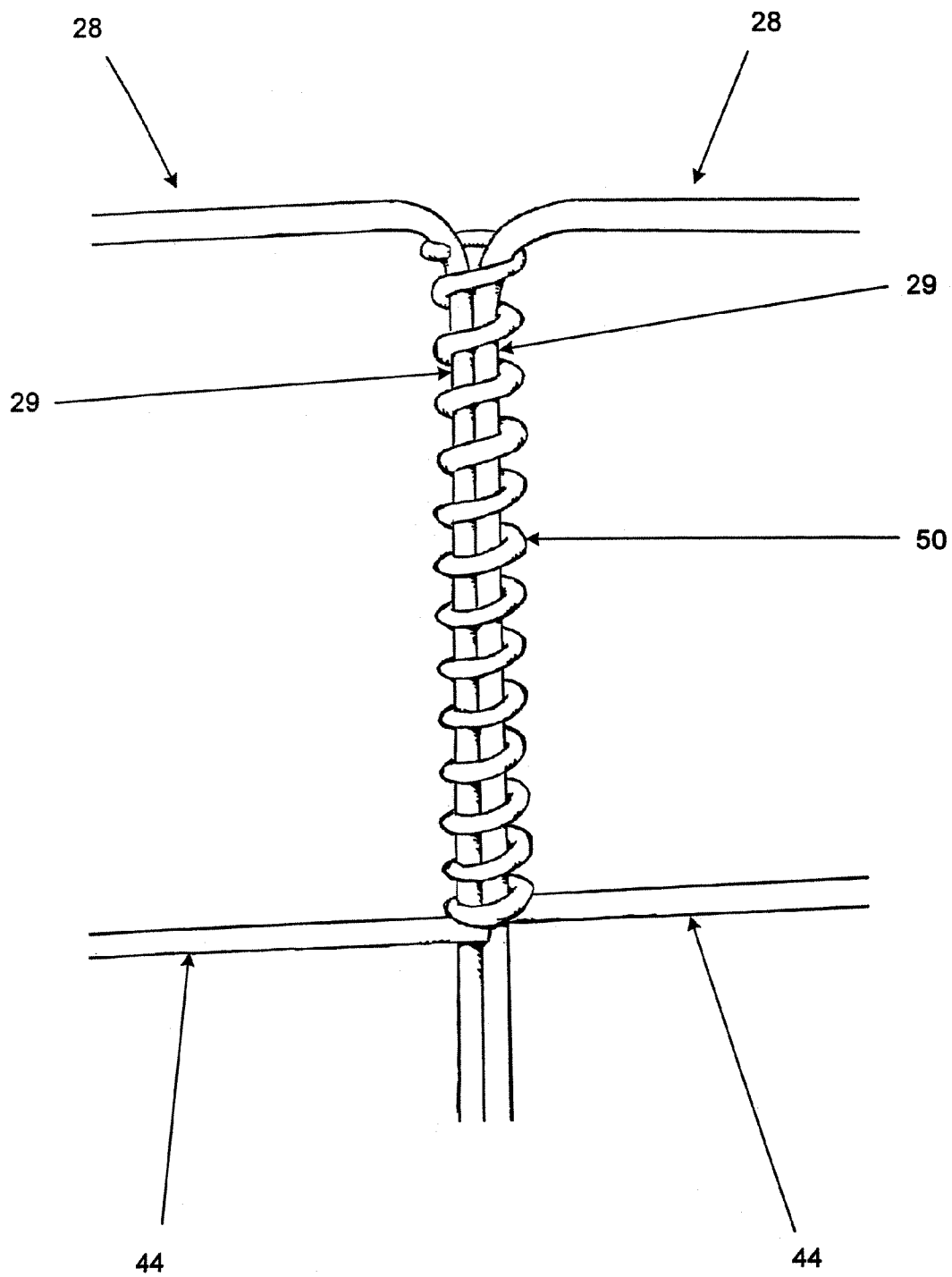
FIG. 9 is an enlarged view of a spring connector in accordance with one embodiment of the present invention.
Figure 10:
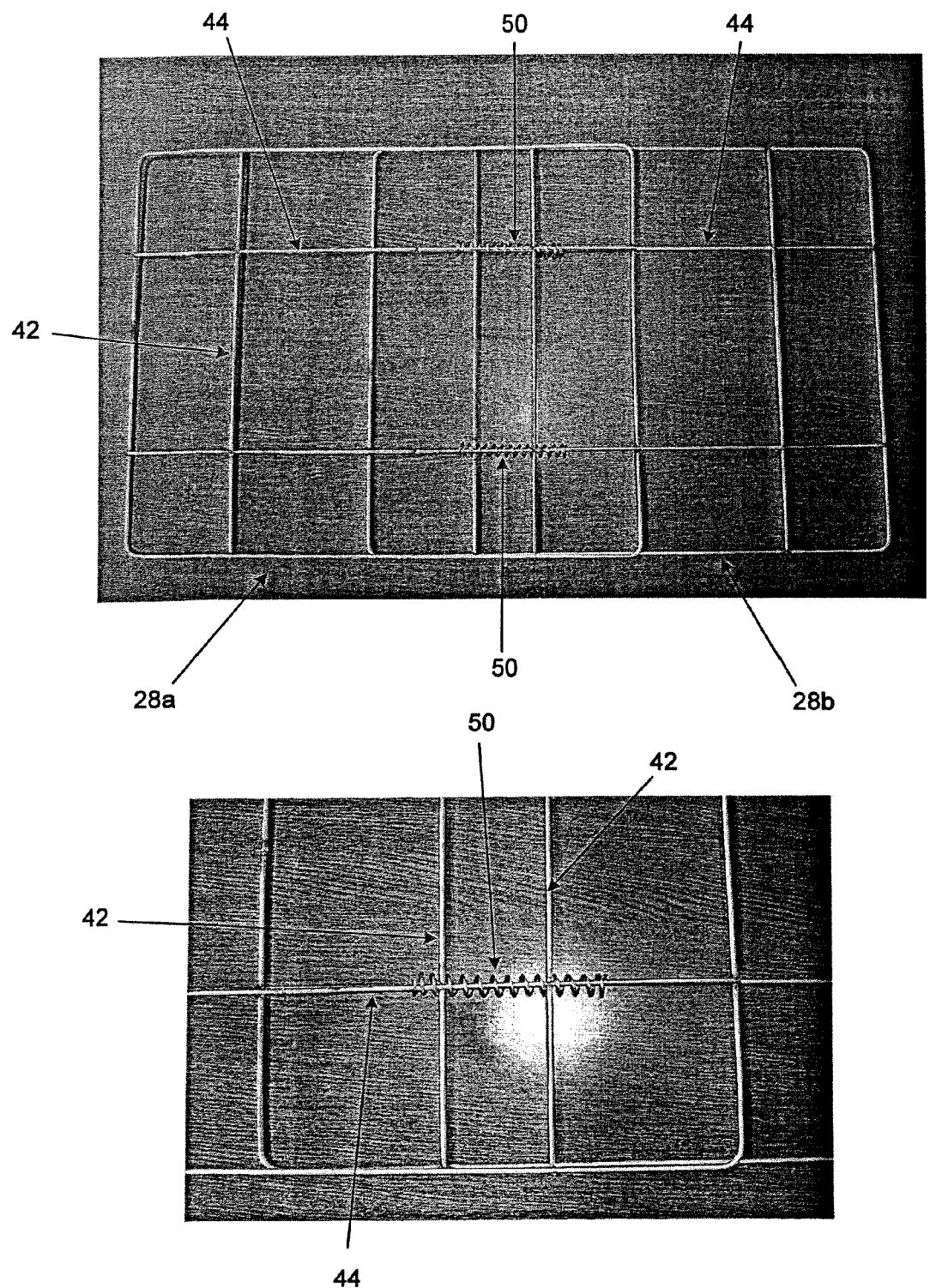
FIG. 10 is a diagrammatic illustration of how two frame members are connected with one or more horizontal spring connectors.

Referring now to the numerous figures, wherein like references identify like elements of the invention, FIGS. 1 through 7 illustrate examples of the prior art as presented in Culwell, U.S. Pat. No. 6,152,980, and FIGS. 8 through 10 illustrate various exemplary embodiments of the present invention.

Figure 1:
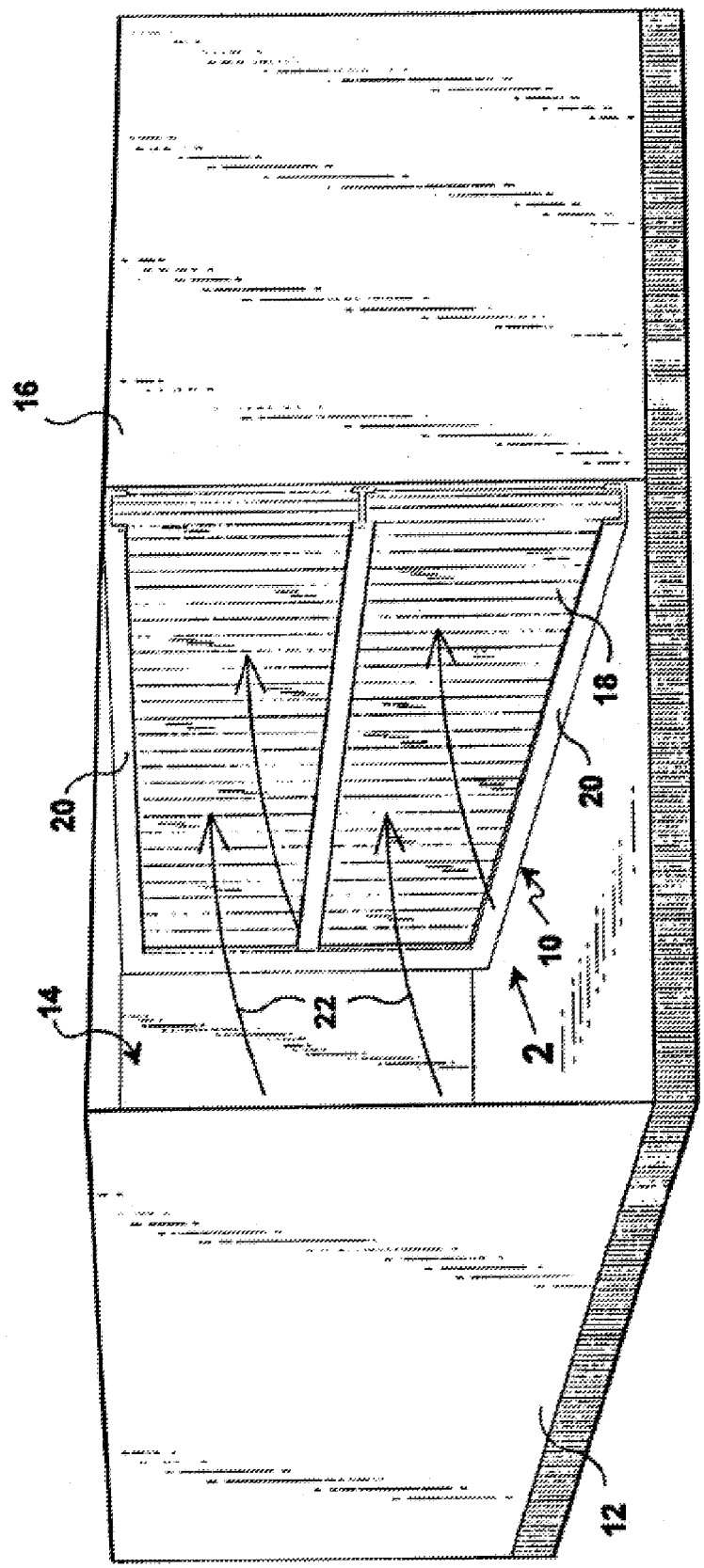
FIG. 1 shows a perspective view of a commercial air conditioning unit with an on-site fabricated filter element installed into the original equipment manufacturer's filter housing.

FIG. 1 illustrates a perspective view of a commercial air conditioning unit 12 having an access panel 14 removed from its housing 16 showing the prior Culwell device 10 comprising an onsite fabricated filter element 18 installed into the original equipment manufacturer's filter housing 20. The direction of air flow is indicated by arrows 22. The filter element 18 may comprise a mixture of natural and synthetic fibers. The air filter housing 20 forms a frame around the perimeter of the generally vertically standing filter 18 so that the filter 18 is contained and secured within the housing 20. The filter 18 has a pleated portion 24 and a non-pleated portion 26.

Figure 2:
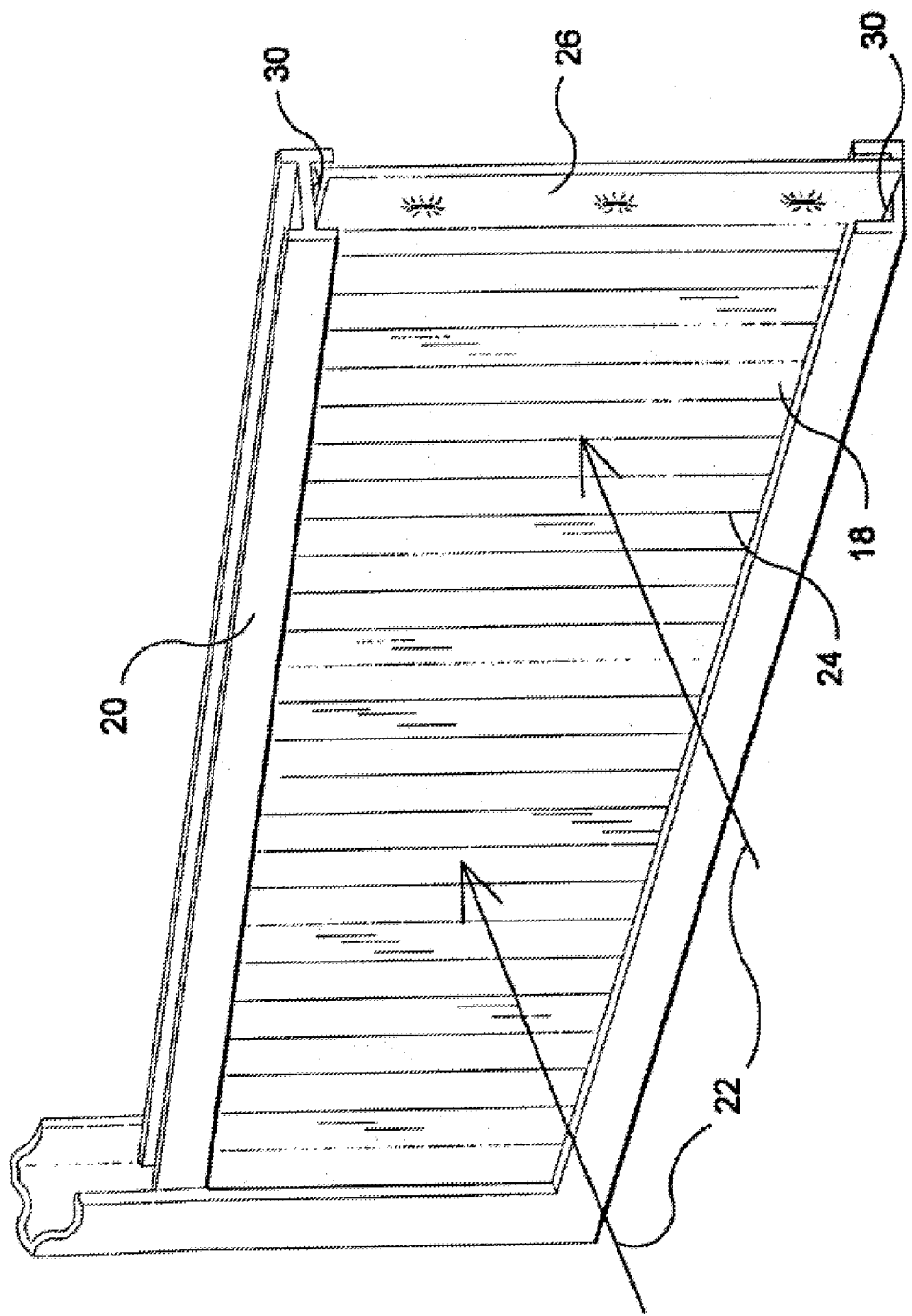
FIG. 2 is an enlarged view of the filter housing and filter element of FIG. 1.

FIG. 2 shows an enlarged view of the filter housing 20 with the onsite fabricated filter 18 installed therein. The direction of air flow is indicated by arrows 22. The filter 18 has a pleated portion 24 and a non-pleated portion 26.

Figure 3:
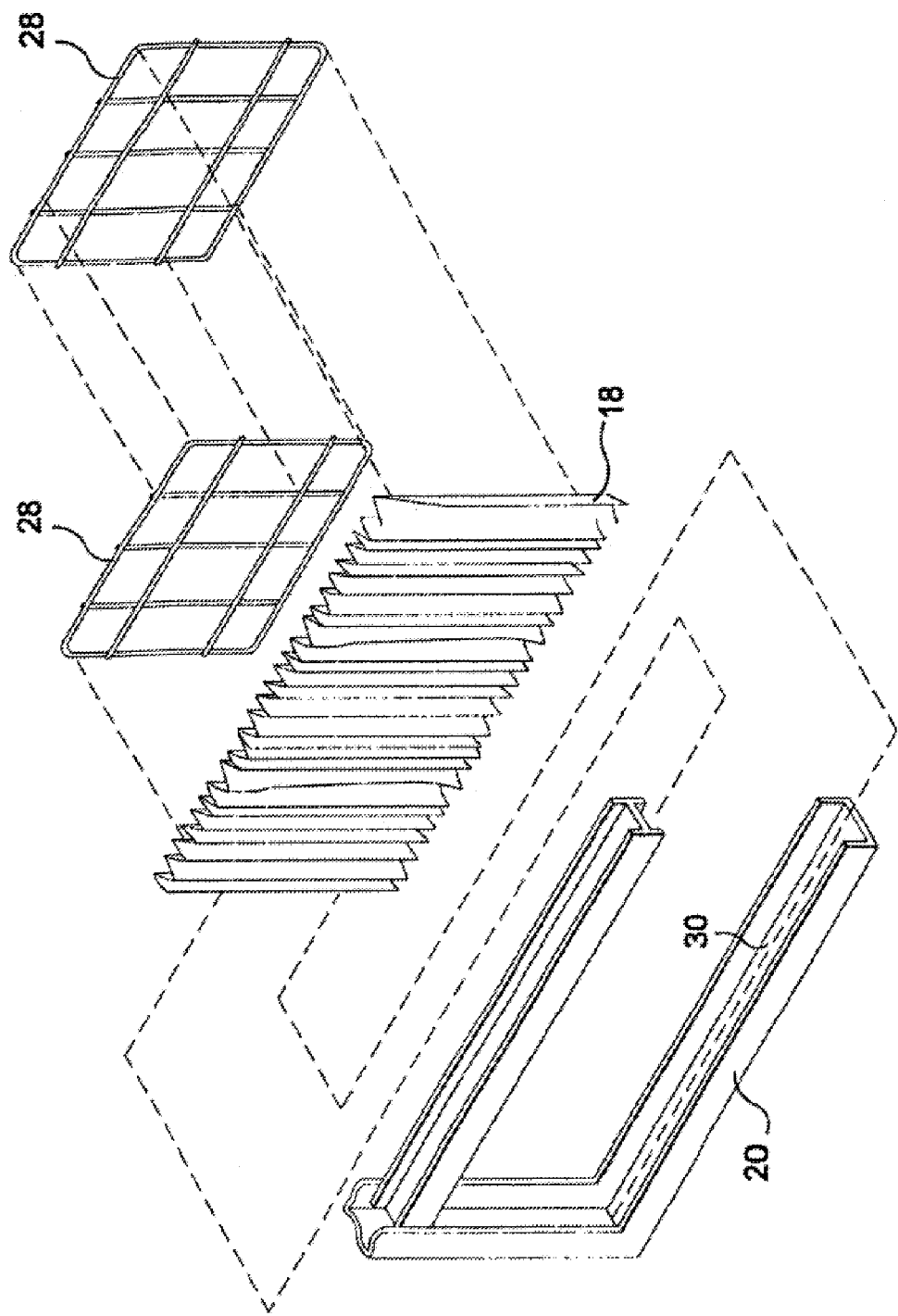
FIG. 3 is an exploded view of a filter unit comprising overlapping rigid frame members and filter media.

FIG. 3 shows an exploded view of the rigid wire frame members 28 having vertical and horizontal structural support members which will be customized onsite to conform to a filter housing 20 and the filter media 18. The dotted guidelines indicate how the wire frame members 28 are overlapped and placed on the rear side of the filter media 18, and the combination thereafter slidably mounted into the channels 30 formed by the horizontal members of the filter housing 20. The filter 18 mounted on the rigid wire frame members 28 thus is held within the filter housing 20 within the side loading channels 30. The wire frame members 28 may be made from any suitably rigid material, including but not limited to metal or plastic.

Figure 4:
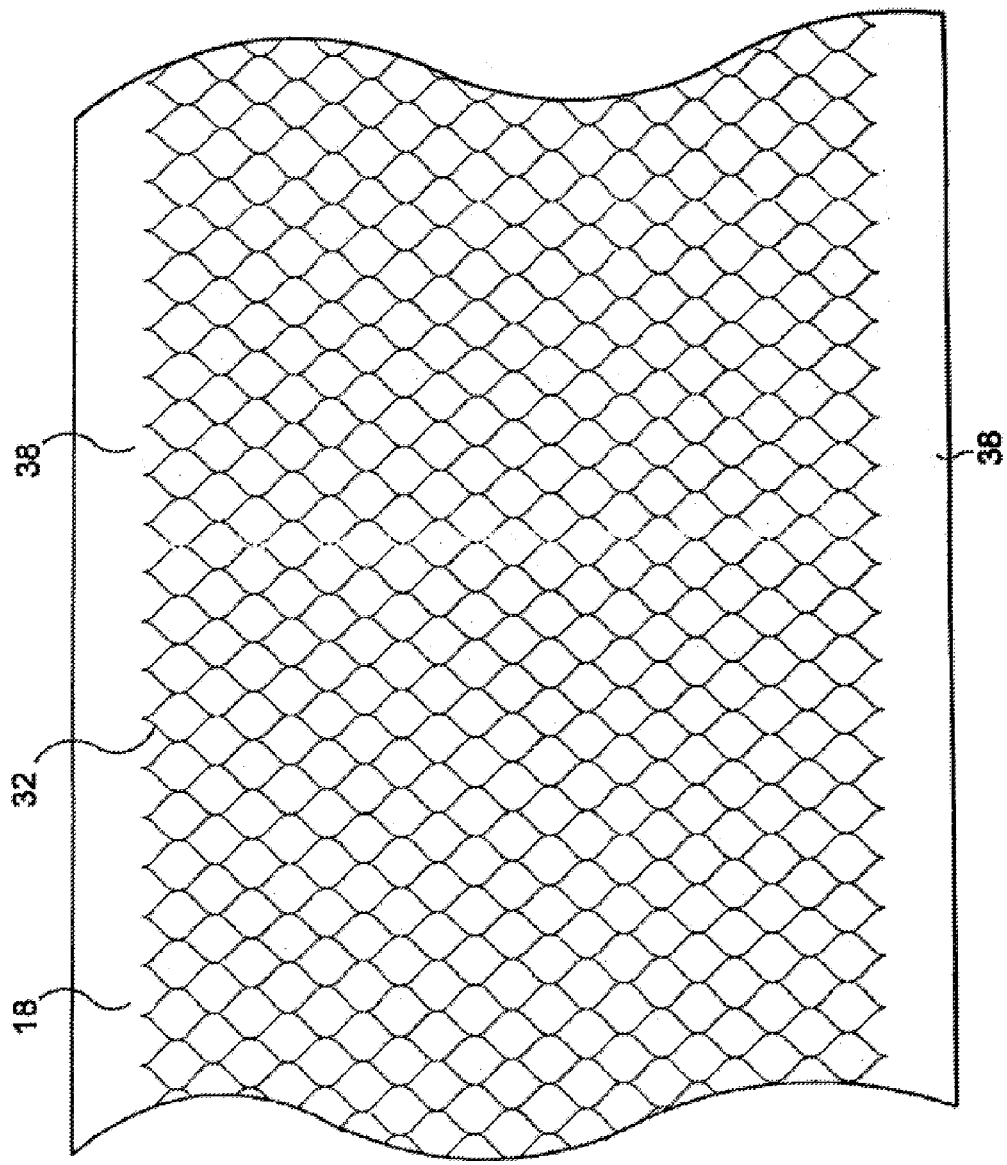
FIG. 4 is a rear view of a filter unit showing the filter media with thin wire mesh backing.

FIG. 4 shows a rear view of the filter media 18. The fabric-like material of the filter media 18 has a thin wire mesh backing 32 bonded thereto, leaving an amount of filter media on the top edge and bottom edge of the filter which extends beyond the wire mesh 32, referred to herein as the selvage or skirt 38. The wire mesh 32 provides means for securing and holding the pleated portion of said filter material for the life of the filter media 18. The skirt 38 can slide into and fill and form a gasket within and conform to the channels 30 of the filter housing 20, thereby forming an air seal. The seal forces all air to flow through the filter element 18, thus increasing the efficiency of the air conditioning unit.

Figure 5:
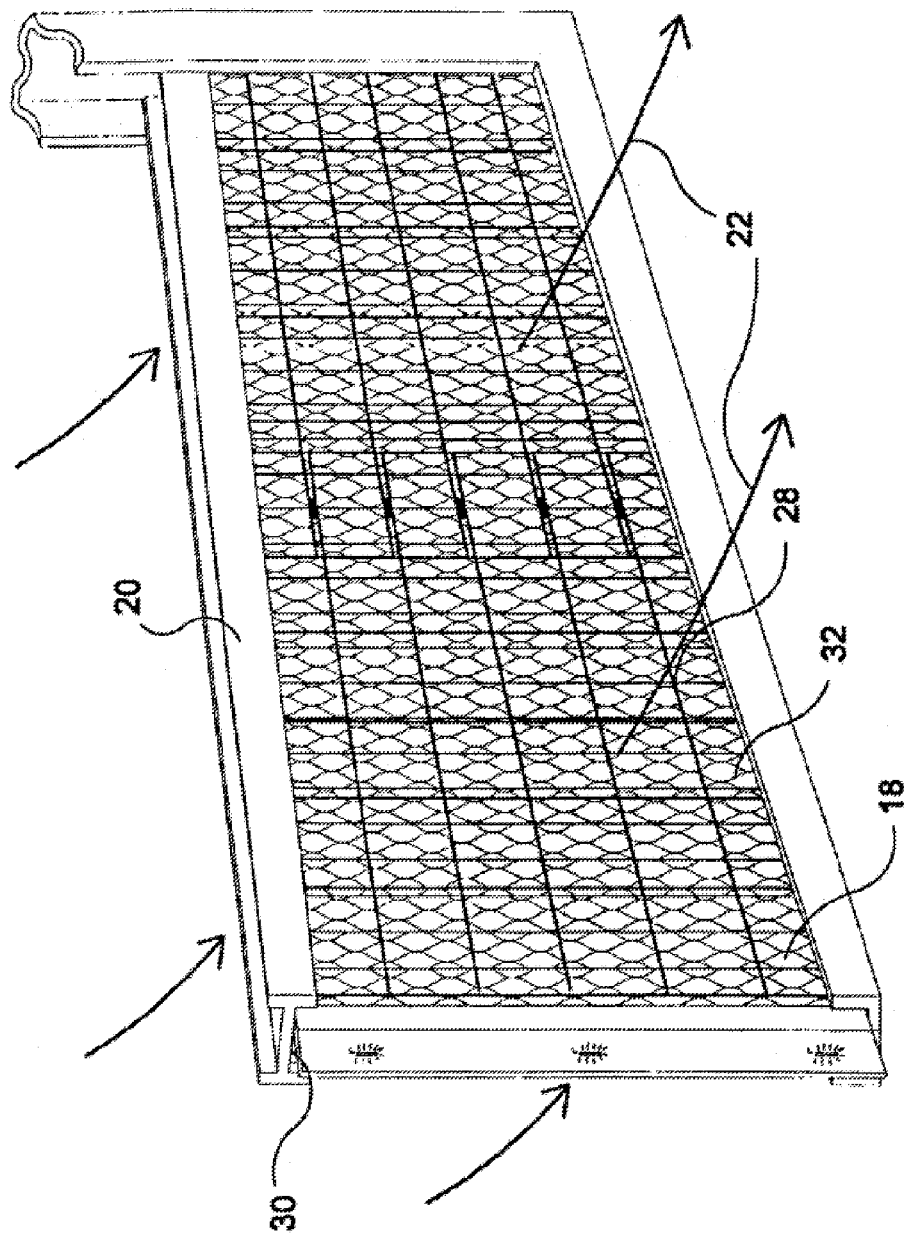
FIG. 5 is a rear view of the filter unit of FIG. 2.

FIG. 5 illustrates a rear view of the filter element 18 installed into a typical original equipment manufacturer's filter housing 20. The direction of airflow is indicated by arrows 22. The wire mesh 32 is shown on the downstream side of airflow. The overlapping wire frame members 28 are mounted vertically and contiguous with the filter element 18.

Figure 5A:
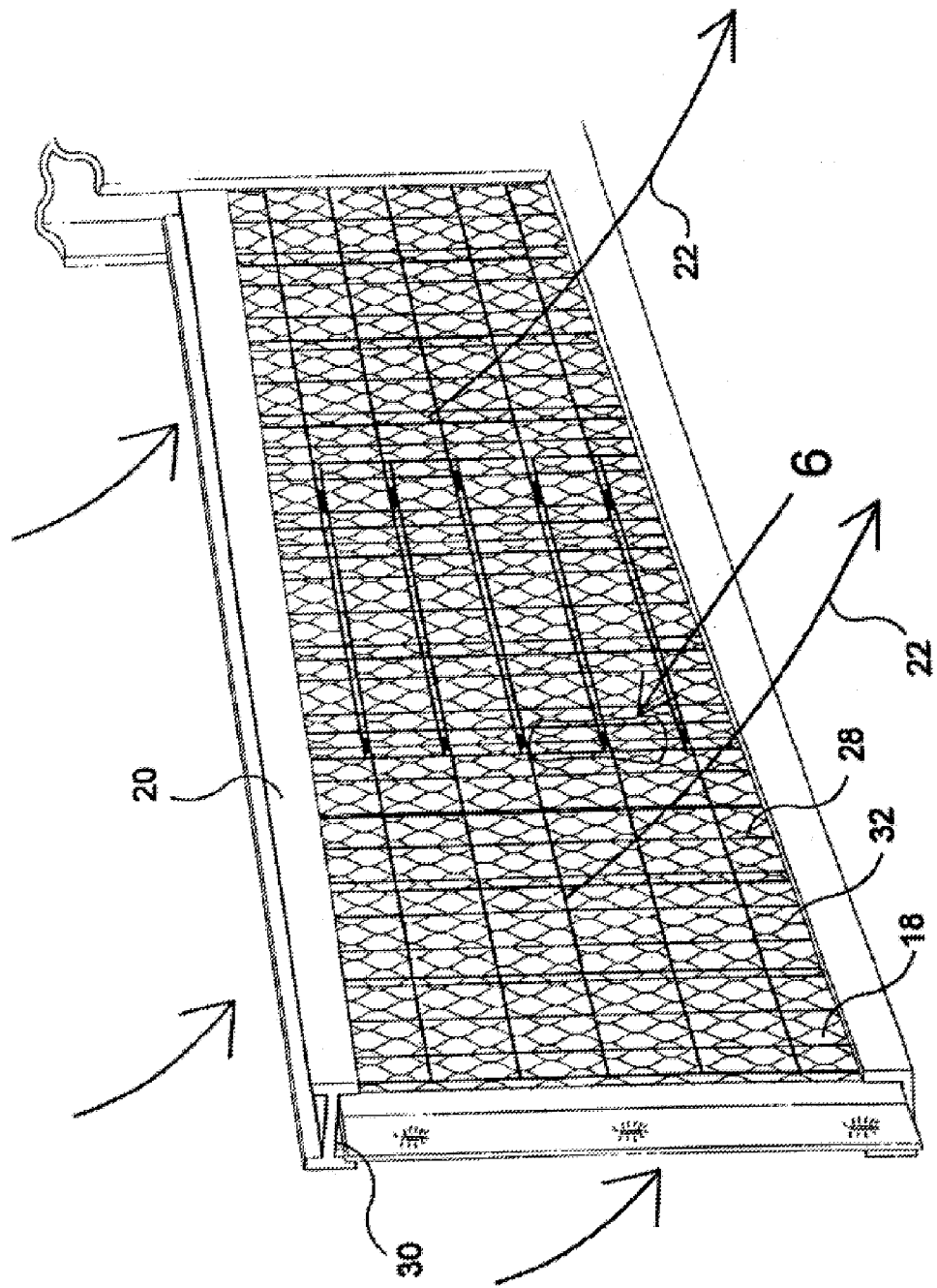
FIG. 5A is a rear view of a variation of the filter unit of FIG. 5, showing more securement points fastening the overlapping rigid frame members.
Figure 6:
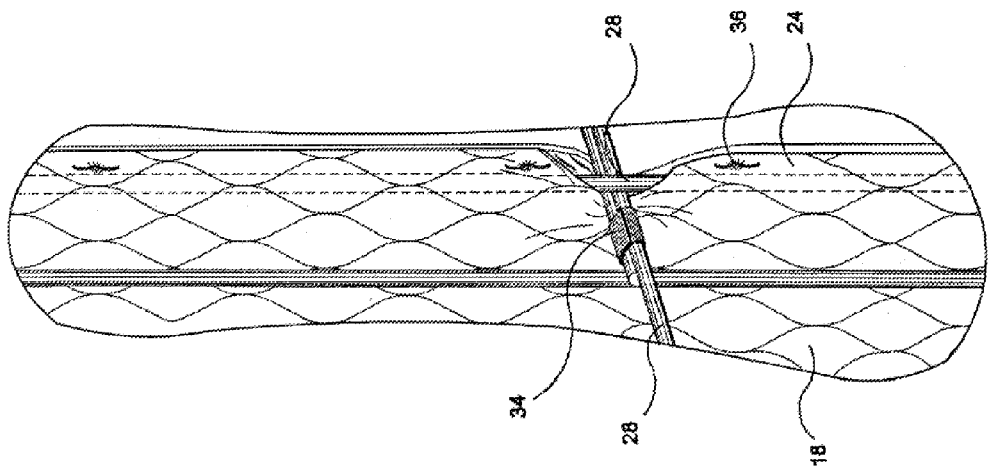
FIG. 6 is an enlarged view showing the means of attachment of the filter media to the frame members, and the means of attachment of the overlapping rigid frame members.

FIGS. 5A and 6 show a variation of FIG. 5, wherein more securement points 34 are used to rigidly attach the overlapping rigid wire frame members 28 together. FIG. 6 shows the means for securing 34 the overlapping rigid wire frame members 28 by having a length of special adhesive tape wrapped around the rigid wire frame members 28 so as to secure the frame members to be contiguous. The filter media 18 is attached to the rigid wire frame members 28 by means of drawing pleats 24 partially around a section of a rigid wire frame member 28 and fastening said pleats 24 to each other by fastening means 36, such as epoxy-coated staples, clips, or the like.

Figure 7:
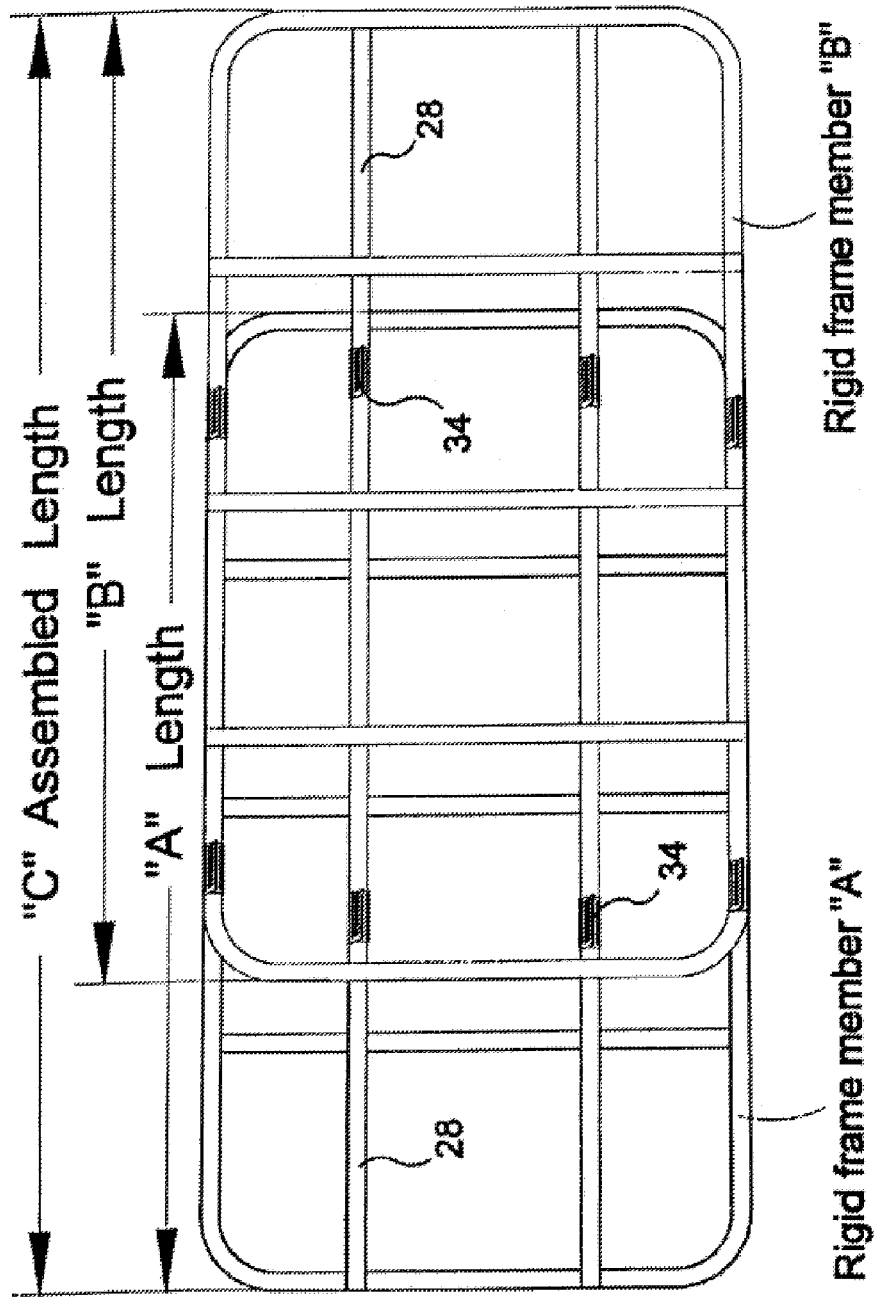
FIG. 7 is a diagrammatic illustration showing how two rigid frame members are rigidly assembled in accordance with the prior art.
Figure 7A:
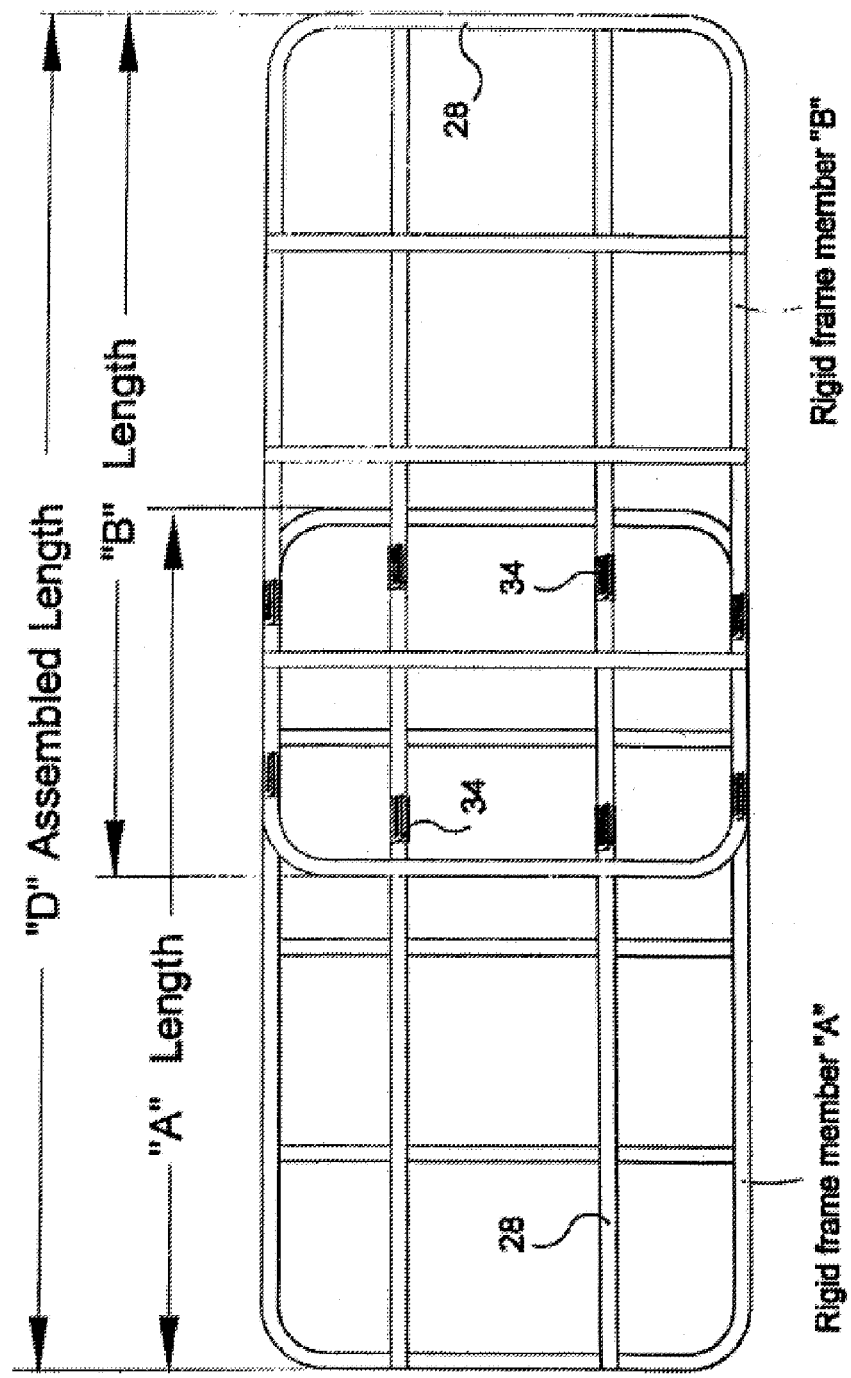
FIG. 7A is a diagrammatic illustration showing an alternative configuration of how two rigid frame members may be rigidly assembled in accordance with the prior art.

FIGS. 7 and 7A show how two prefabricated rigid wire members 28, having been transported to a job site, are selected as the appropriate vertical size and are overlapped to the appropriate horizontal side to fit the housing 20 before being secured to each other by means of a special adhesive tape 34. The filter 18 subsequently is affixed to the frame 28 by means of a plurality of staples or other fastening means 36 as shown in FIG. 6.

FIG. 8 shows an improvement over the prior art comprising flexible, not rigid, attachment of the rigid wire frame members 28 end to end by flexible attachment means 50. The flexible attachment means hold the wire frame members 28 together without overlap, and the wire frames 28 when inserted into the filter housing 20 provides the necessary structural support for the filter element 18. Because the wire frame members 28 are flexibly attached, the assembled filter unit of the present invention can be inserted into the filter housing 20 one frame at a time, with the frame sections yet to be inserted folded or directed off to one side, thus bypassing space restrictions that would prevent a full-sized filter unit with rigidly attached frame members 28, constructed in accordance with the prior art, from being removed or inserted.

In one exemplary embodiment, the flexible attachment means 50 comprises one or more spring connectors, as seen in FIGS. 8 and 9. FIG. 8 shows two spring connectors 50 used to flexibly fasten the upper and lower portions of the corresponding vertical end-members 29 of two juxtaposed wire frames 28 together, but fewer or more may be used. The spring connectors 50 are installed by hand by turning one end over the end-members 29 to be connected, and then threading the connector 50 by turning it in the appropriate direction. Removal may be accomplished by reversing these steps.

As seen in FIG. 8, the wire frames 28 have a plurality of interior support rods 42, 44 that provide structural support for the frame and filter element 18. The spacing between the interior support rods 42, 44 may vary based on the size of the filter unit need, and they may be vertical 42, horizontal 44, or at an angle with respect to the outside of the wire frame. In one exemplary embodiment, the spacing between the outside of the wire frame (i.e., the sides 29, the top, and the bottom) and the nearest interior support is constant. Spring connectors 50 may then be sized to match that constant distance, as shown in FIGS. 8 and 9, which helps prevent vertical movement of connected wire frame members 28 with respect to each other. The interior diameter of the spring connectors 50 may also be sized so as to keep the end-members 29 in proximity to each other, but with sufficient room to allow rotation with respect to each other. The interior diameter of the spring connectors will vary, depending on the diameter of the end-members. In a preferred embodiment, the spring connectors 50 are fashioned from steel or metal, but they also may be fashioned from any other suitable material. As an example of one possible configuration, the spring connectors may be four inches long, with a maximum outer diameter of approximately 0.5 inches, a inner diameter of approximate 0.376 inches, fashioned from galvanized wire of approximately 0.0625 inches diameter, with 14 total coils (12 active coils).

In another exemplary embodiment, as seen in FIG. 10, in order to achieve a precise length for the total frame and filter unit, the wire frame member 28a at one end of the flexible frame construct may be caused to overlap with the adjacent frame member 28b. These two frame members may then be rigidly attached as described in the prior art, or may be attached with one or more spring connectors 50 applied to the horizontal interior support rods 44 in a manner similar to that described above. Depending on the installation need, the spring connectors 50 may be applied to a relatively unbounded section of the rods 44, thus allowing some horizontal movement of the two frame members with respect to each other, but limited vertical movement. Alternatively, the spring connectors 50 may be applied so as to encompass one or more of the vertical interior support rods 42, as shown in FIG. 10. This configuration limits vertical movement, and allows only some horizontal movement with spring resistance. Thus, as the access panel 14 door is replaced, it may push the end frame member 28 in slightly, causing the spring connectors 50 to compress and apply a force pushing the end frame member against the closed access panel door, thereby creating a better seal and enhancing the efficiency of the filter unit.

Figure 11:
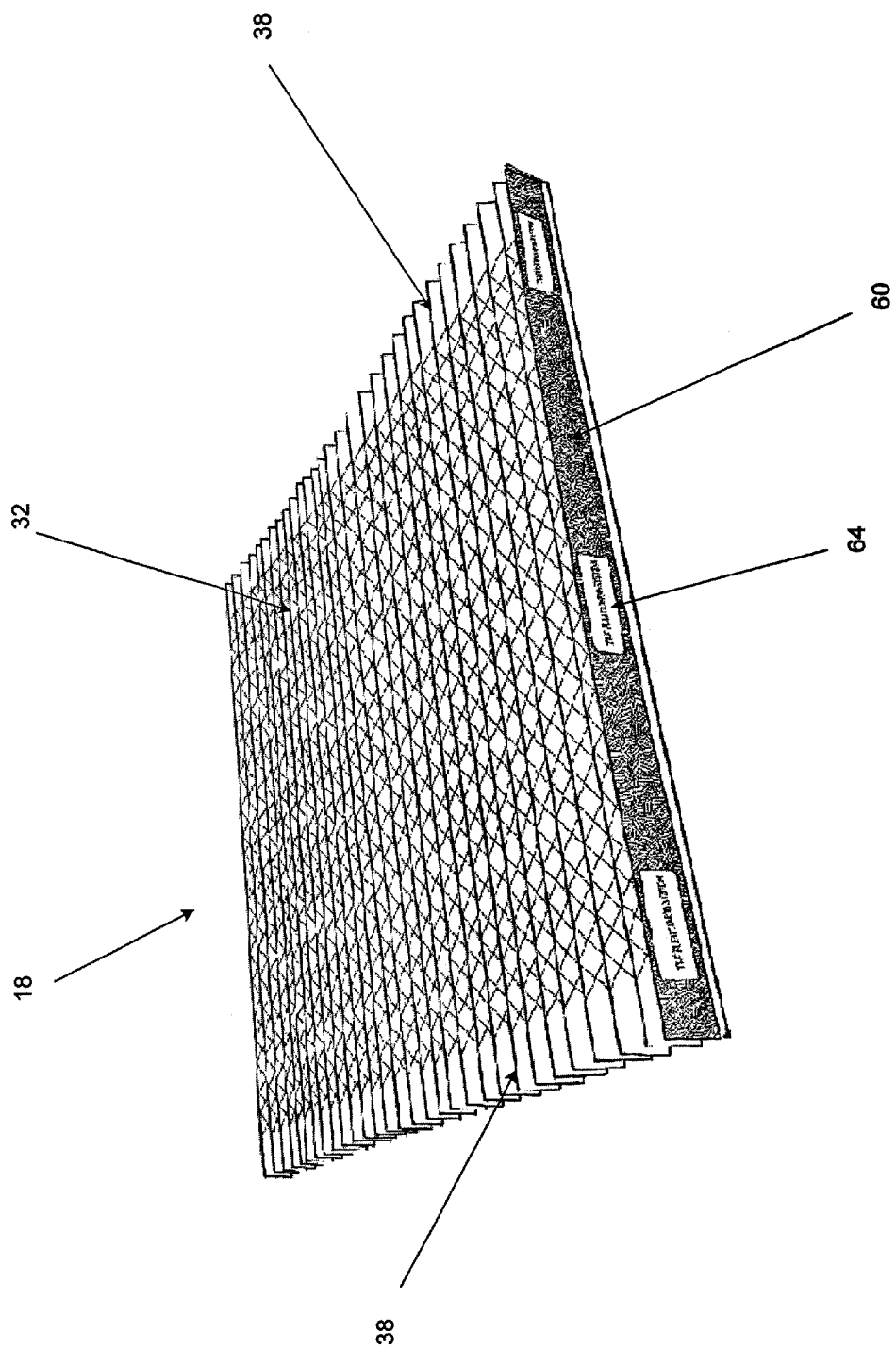
FIG. 11 is a perspective view of an end-piece fastened to one end of a filter in accordance with one embodiment of the present invention.

FIG. 11 shows an end-cap 60 placed over one end 26 of the filter element 18. This end may be an unpleated end as disclosed in the prior art, or simply one half of a pleat, where the filter element 18 is pleated for its entire length, as shown in FIG. 11. The end-cap 60 protects the end of the filter element 18 from abrasion and wear during shipping, handling, and installation of the filter 18, and covers the exposed ends of the wire mesh backing 32, which may be sharp. In another exemplary embodiment, the end-cap 60 may be placed over both ends of the filter element 18. The end-cap 60 may be made of any appropriate protective material, including, but not limited to, adhesive tape, cardboard, heavy paper, or plastic, and may be affixed to the filter 18 by any suitable means, such as adhesive, glue, staples, or the like. In yet another exemplary embodiment, the end-cap 60 contains printed material 64, such as text or pictures, on some or all of its surface, which may include instructions for use, identifying labels or symbols, logos, or the like.

The end-cap 60 may extend for the entire width of the filter unit 18, or may extend for a distance to match the wire mesh 32, thereby leaving one or both skirts 38 uncovered. The configuration used may depend on the material used to construct the end-cap 60, as stiffer materials will interfere with the ability of the skirt 38 to slide into and fill and form a gasket within and conform to the channels 30 of the filter housing 20, thereby forming an air seal. A flexible material, such as adhesive tape, will not interfere with that function, and may be used for the entire width of the filter 18.

In an alternative exemplary embodiment, a type of end-cap may be formed at one or both ends of the filter element 18 by folding over the end of the filter media upon itself in the form of a flap, and fastening or bonding the edge of the filter media with glue, adhesive, bonding material, or the like. As described above, this protects the end of the filter element 18 from abrasion and wear during shipping, handling, and installation of the filter 18, and covers the exposed ends of the wire mesh backing 32, which may be sharp.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

We claim:

1. An air filter apparatus, comprising:
a filter media;
wire mesh positioned on one side of said filter media;
means for attaching said wire mesh to said filter media;
a frame comprising one or more frame members upon which said filter media and said wire mesh are attached, wherein one or more of said frame members are flexibly attached at their ends by flexible attachment means; and
means for attaching said filter media to said frame.

2. The apparatus of claim 1, wherein said means for attaching said filter media to said frame comprises pleats of said filter media drawn around said frame members and secured to each other by pleat fastening means.

3. The apparatus of claim 2, wherein said pleat fastening means comprises staples.

4. The apparatus of claim 3, wherein said staples are epoxy coated.

5. The apparatus of claim 1, wherein said wire mesh is positioned on the rear side of said filter media.

6. The apparatus of claim 1, wherein one or more of said frame members comprises metal.

7. The apparatus of claim 1, wherein one or more of said frame members comprises plastic.

8. The apparatus of claim 1, wherein said flexible attachment means comprises one or more spring connectors.

9. The apparatus of claim 8, wherein said spring connectors are threaded around a portion of said frame members.

10. The apparatus of claim 8, wherein said spring connectors are positioned to prevent vertical movement of the connected frame members with respect to each other.

11. The apparatus of claim 1, wherein said filter media further comprises a skirt extended beyond said wire mesh on the top and bottom edge of said filter media.

12. The apparatus of claim 1, wherein the wire mesh is attached to said filter media by bonding.

13. The apparatus of claim 1, wherein said filter media comprises natural or synthetic fibers, or a combination thereof.

14. The apparatus of claim 1, wherein the frame with attached filter media and wire mesh is adapted to be slidably positioned in an air filter housing.

15. The apparatus of claim 1, further wherein the frame member at one end of said frame is attached to the adjacent frame member by one or more spring connectors threaded along horizontal elements of the frame members.

* * * * *